United States Patent

Budzynski et al.

[11] Patent Number: 5,433,916
[45] Date of Patent: Jul. 18, 1995

[54] UTILIZING MULTI CAVITY MOLD IN EXTRUSION BLOW MOLDING PROCESS

[75] Inventors: Danny L. Budzynski, Greenville; Gary S. Bliss, Slimpsonville, both of S.C.

[73] Assignee: Dowbrands, Inc., Indianapolois, Ind.

[21] Appl. No.: 80,456

[22] Filed: Jun. 18, 1993

[51] Int. Cl.⁶ .............................................. B29C 39/02
[52] U.S. Cl. .................................................... 264/540
[58] Field of Search ............... 264/540, 541, 542, 543; 425/532, 538, 539, 540

[56] References Cited

U.S. PATENT DOCUMENTS

| | | | |
|---|---|---|---|
| 3,355,763 | 12/1967 | Willert | 264/540 |
| 3,399,424 | 9/1968 | Sheptak | 18/5 |
| 3,464,091 | 9/1969 | Bielfeldt | 18/30 |
| 3,640,661 | 2/1972 | Gasior et al. | 425/159 |
| 3,802,823 | 4/1974 | Doughty et al. | 425/326 |
| 3,854,855 | 12/1974 | Pollock et al. | 425/538 |
| 4,090,836 | 5/1978 | von der Ohe et al. | 425/574 |
| 4,362,688 | 12/1982 | Nakayama | 264/503 |
| 4,674,969 | 6/1987 | Korn | 425/325 |
| 4,861,542 | 8/1989 | Oles et al. | 264/542 |
| 5,073,617 | 12/1991 | Jorge et al. | 526/343 |
| 5,118,460 | 6/1992 | Rydmann | 264/509 |

FOREIGN PATENT DOCUMENTS

| | | |
|---|---|---|
| 0048113 | 3/1982 | European Pat. Off. |
| 0143278 | 6/1985 | European Pat. Off. |
| 0405536 | 1/1991 | European Pat. Off. |
| 45-15144 | 5/1970 | Japan |
| 5-245914 | 9/1993 | Japan |
| 2255929 | 11/1992 | United Kingdom |

*Primary Examiner*—Christopher A. Fiorilla

[57] ABSTRACT

A method for blow molding first and second articles, each having a different shape, includes the step of changing the positioning between an extruder head and a mold set after forming the first article from a first parison. The mold set has first and second mold halves which define first and second cavities having different shapes. The step of changing the positioning between an extruder head and a mold set may include changing the position of the mold set or changing the position of the extruder head.

6 Claims, 3 Drawing Sheets

5,433,916

UTILIZING MULTI CAVITY MOLD IN EXTRUSION BLOW MOLDING PROCESS

The present invention relates generally to a blow molding apparatus and a method for blow molding and, more particularly, to a blow molding apparatus and a method for blow molding utilizing a plurality of multi cavity mold sets on a rotating blow molder. The cavities of each mold set are designed to allow different bottle designs to be produced by changing the positioning between an extruder head and the mold set.

The BACKGROUND OF THE INVENTION

Conventional blow molding machines are known which employ rotating blow molder wheels utilizing single cavity mold sets to produce one bottle design per blow molder wheel. The downtime required to change the blow molder wheel, mold sets, or other equipment in a conventional blow molding machine in order to use the same extrusion system to produce a different bottle design is quite costly.

SUMMARY OF THE INVENTION

One aspect of the present invention is directed to a blow molding apparatus comprising an extruder means comprising a die head for issuing a parison of polymeric material and a rotating blow molder wheel. The blow molder wheel comprises a plurality of opposing platen sets, each set having a pair of mold halves mounted thereon. The pair of mold halves define multiple mold cavities when engaged. The extruder means is slideably mounted adjacent to the rotating blow molder wheel to enable the parison to line up with the desired mold cavity. In another embodiment of the present invention, the blow molder wheel is slideably mounted adjacent to the extruder means to be movable relative to the die head for aligning the parison issuing from the die head with the desired mold cavity.

Another aspect of the present invention is directed to a method for blow molding different bottle designs by changing the positioning between an extruder die head and a multi-cavity mold set on a rotating blow molder wheel. The method comprises the steps of molding a first bottle of a first design via a first mold cavity, releasing the first bottle, slideably aligning the rotating wheel to line up the die head with a second mold cavity, molding a second bottle of a second design via the second mold cavity, and releasing the second bottle.

In accordance with a third aspect of the present invention, a method is provided for blow molding different bottles having different designs by changing the position between an extruder die head and mold cavities of first and second multi-cavity mold sets on a rotating blow molder wheel. The method comprises the steps of: extruding a first parison from the die head such that the parison is located between mold halves of the first mold set; engaging the mold halves with one another with the parison engaged therebetween; introducing air through a blow pin into the parison to form a first bottle of a first design; cooling the first bottle located between the mold halves of the first mold set; releasing the first bottle by opening the mold halves of the first mold set; changing the positioning between the extruder and the rotating blow molder wheel; extruding a second parison from the die head such that the second parison is located between the mold halves of the second mold set; engaging the mold halves of the second mold set with one another with the parison engaged therebetween; introducing air through a blow pin into the second parison to create a second bottle of a second design; cooling the second bottle between the mold halves of the second mold set; and releasing the second bottle by opening the mold halves.

DETAILED DESCRIPTION OF THE INVENTION

Figure 1:
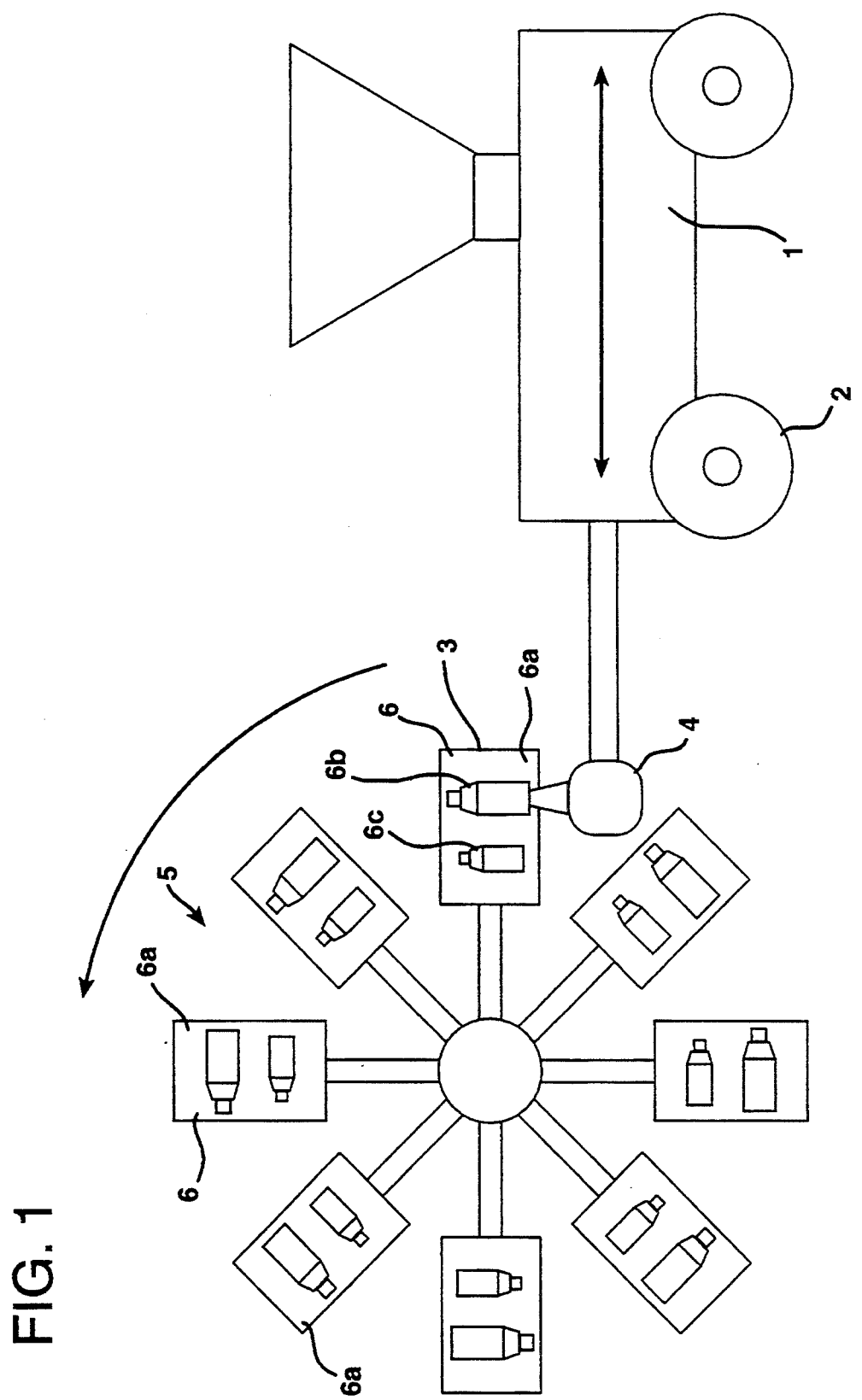
FIG. 1 is a schematic side elevational view of a blow-molding system constructed in accordance with a first embodiment of the present invention having an extruder means and a rotatable blow molder wheel with only one mold half of each mold set on the blow molder wheel shown.

With reference to FIG. 1, there is shown a blow-molding system constructed in accordance with a first embodiment of the present invention. The blow-molding system includes a movable extruder means 1 and a rotatable blow molder wheel 5. The blow molder wheel 5 comprises a plurality of blow mold sets 6 mounted on opposing platens 3. Each blow mold set 6 comprises first and second blow mold halves. Only the first blow mold half 6a of each mold set 6 is shown in the drawings. Each blow mold set 6 includes first and second inner cavities 6b and 6c, each having a different shape. Accordingly, articles (not shown) formed within the inner cavities 6b and 6c will have different shapes.

The extruder means 1 includes a die head 4 from which a parison of polymeric material (not shown) is extruded. The extruder means 1 is mounted on wheels 2 to slideably align the die head 4 with one of the mold cavities 6b and 6c defined in a mold set 6.

A first bottle of a first design is created by extruding the parison material from the die head 4 such that the parison is received within the first cavity 6b in a first mold set 6. Thereafter, the mold halves of the first mold set 6 are closed. Air is introduced through a blow pin (not shown) into the parison to form the first bottle (not shown). The first bottle is cooled between the mold set halves and is subsequently released by opening the mold halves. In the present invention the design of the bottle can be changed without having to change mold sets by moving the extruder means 1 via wheels 2 to enable the die head 4 to line up with a second cavity 6c of the mold sets 6. Second bottles of a second design can then be formed within the cavities 6c of the mold sets 6.

Figure 2:
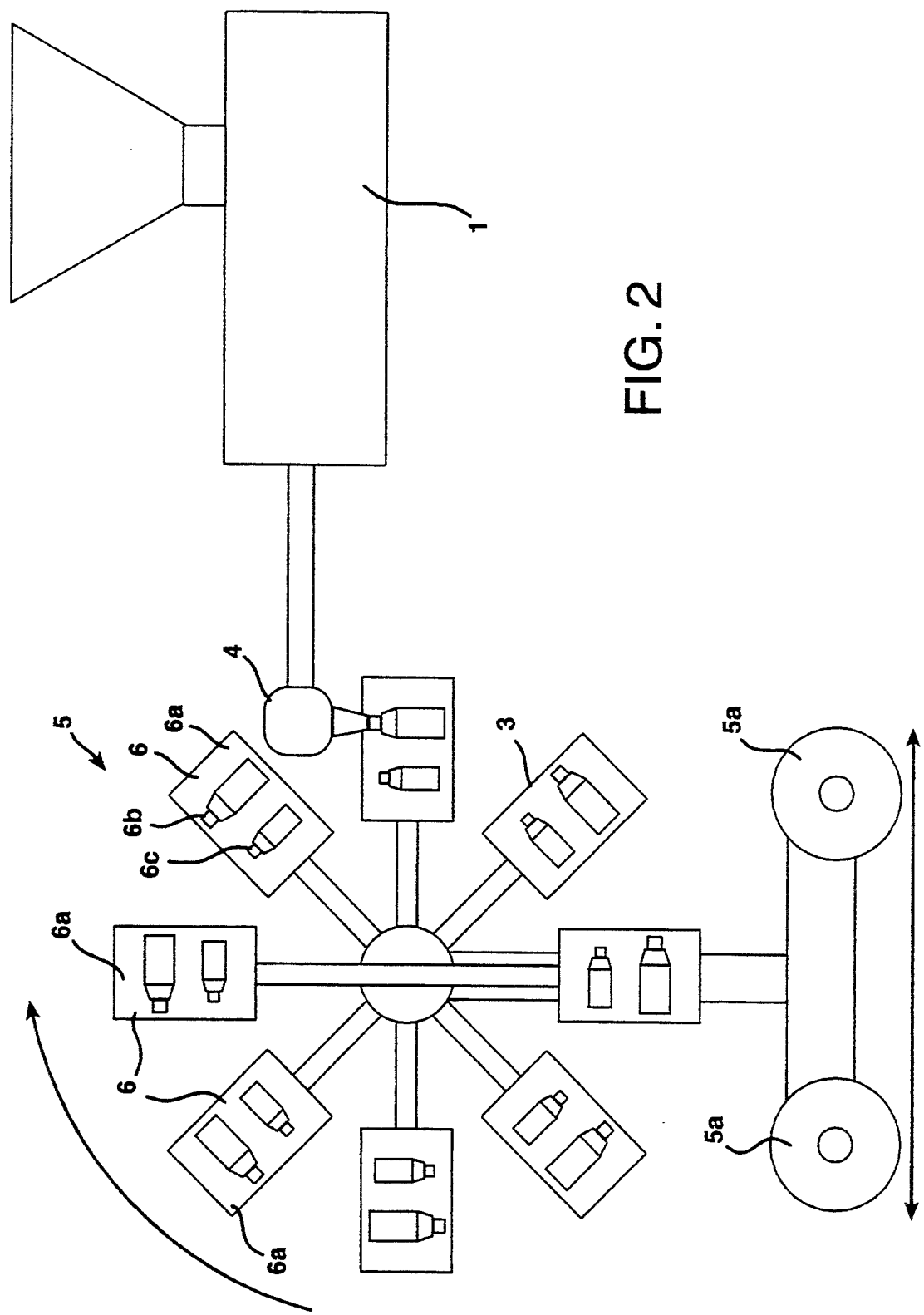
FIG. 2 is a schematic side elevational view of a blow-molding system constructed in accordance with a second embodiment of the present invention having an extruder means and a rotatable blow molder wheel with only one mold half of each mold set on the blow molder wheel shown.

FIG. 2 shows another embodiment of the blow molding system of the present invention, where like elements are referenced by like numerals. In this embodiment, the rotating blow molder wheel 5 is movable via wheels 5a relative to the extrusion system 1 such that the die head 4 can be selectively aligned with one of the cavities 6b and 6c contained in each mold set 6.

Figure 3:
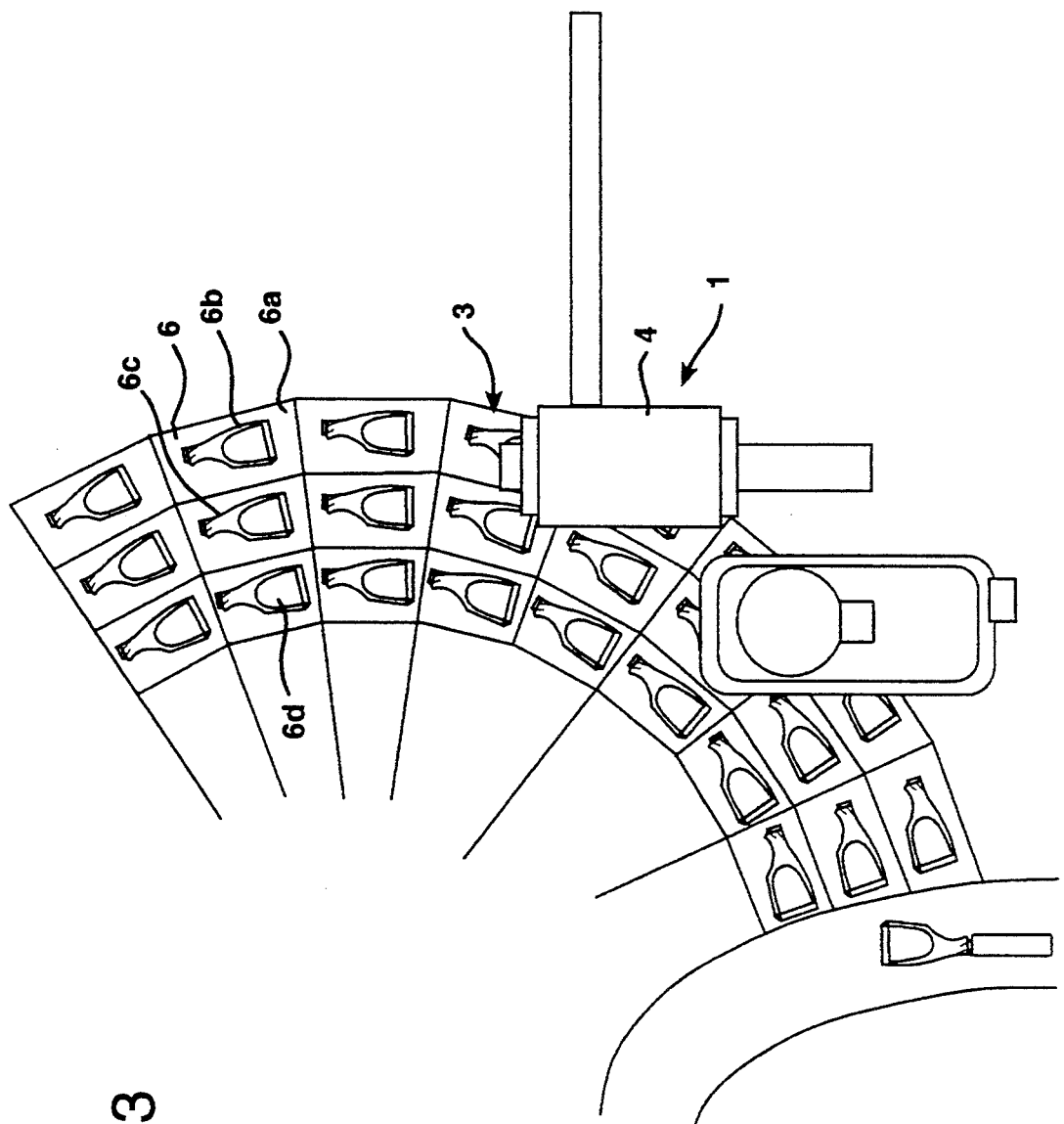
FIG. 3 is a schematic view of a portion of a rotatable molder wheel with only one mold half of each mold set shown and including a die head positioned adjacent to outermost radial cavities of the blow molds.

FIG. 3 illustrates a molder wheel 5 having blow mold sets 6 with first, second and third cavities 6b, 6c and 6d.

Of course, any number of cavities may be provided within the blow molds 6.

The type of blow-molding systems suitable for the present invention can be, for example, conventional axial, radial or book closing blow-molding systems.

Having described the invention in detail and by reference to preferred embodiments thereof, it will be apparent that modifications and variations are possible without departing from the scope of the invention defined in the appended claims.

What is claimed is:

1. A method for blow molding first and second articles, each having a different shape, by changing the positioning between an extruder head and a mold set, the method comprising the steps of:
   providing a mold set having first and second mold halves which define first and second cavities when said mold halves are engaged with one another, said first cavity having a first shape and said second cavity having a second shape which differs from said first shape;
   extruding a first parison from an extrusion die head;
   capturing said first parison between said first and second mold halves such that said first parison is received within said first cavity;
   forming said first parison into a first article having generally the shape of said first cavity;
   releasing said first article from between said first and second mold halves;
   repositioning one of said die head and said mold set such that a second extruded parison is capable of being received within said second cavity;
   extruding a second parison;
   capturing said second parison between said first and second mold halves such that said second parison is received within said second cavity;
   forming said second parison into a second article having generally the shape of said second cavity; and,
   releasing said second article from between said first and second mold halves.

2. A method as set forth in claim 1, wherein said mold set is repositioned to change its position relative to said die head.

3. A method as set forth in claim 1, wherein said die head is repositioned to change its position relative to said mold set.

4. A method for blow molding first and second bottles, each having a different shape, by changing the positioning between an extruder head and a mold set, the method comprising the steps of:
   providing a mold set having first and second mold halves which define first and second cavities when said mold halves are engaged with one another, said first cavity having a first shape and said second cavity having a second shape which differs from said first shape;
   extruding a first parison from an extrusion die head;
   capturing said first parison between said first and second mold halves such that said first parison is received within said first cavity;
   forming said first parison into a first bottle having generally the shape of said first cavity;
   releasing said first bottle from between said first and second mold halves;
   repositioning one of said die head and said mold set such that a second extruded parison is capable of being received within said second cavity;
   extruding a second parison;
   capturing said second parison between said first and second mold halves such that said second parison is received within said second cavity;
   forming said second parison into a second bottle having generally the shape of said second cavity; and,
   releasing said second bottle from between said first and second mold halves.

5. A method as set forth in claim 4, wherein said mold set is repositioned to change its position relative to said die head.

6. A method as set forth in claim 4, wherein said die head is repositioned to change its position relative to said mold set.

* * * * *